United States Patent
Fang et al.

(10) Patent No.: US 7,720,800 B2
(45) Date of Patent: May 18, 2010

(54) METHOD AND APPROACH TO HOSTING VERSIONED WEB SERVICES

(75) Inventors: Ru Fang, Beijing (CN); Liana Liyow Fong, Irvington, NY (US); David C Frank, Ossining, NY (US); Linh Hue Lam, Yorktown Heights, NY (US); Christopher P Vignola, Port Jervis, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 11/774,163

(22) Filed: Jul. 6, 2007

(65) Prior Publication Data

US 2009/0013010 A1   Jan. 8, 2009

(51) Int. Cl.
 *G06F 17/00* (2006.01)
(52) U.S. Cl. .................. 707/203; 707/100; 707/102; 707/204
(58) Field of Classification Search ......... 707/203–204
See application file for complete search history.

(56) References Cited

U.S. PATENT DOCUMENTS 6,625,624 B1 * 9/2003 Chen et al. ............... 707/204
6,904,454 B2 * 6/2005 Stickler ..................... 709/213

OTHER PUBLICATIONS

John Evdemon, "Principles of Service Design: Service Versioning," Microsoft Corporation, Aug. 2005.
Kyle Brown, Michael Ellis, "Best Practices for Web Services," IBM, Jan. 30, 2004.
Sriran Anand, et al., "Best Practices and Solutions for Managing Versioning of SOA Web Services—Patterns and Developer Techniques for Service Versioning," Oct. 25, 2005.
Adam Blum, "UDDI as an Extended Web Services Registry," SOA World Magazine, 2007 SYS-CON Media, Inc.
Aravilli Srinivasa Rao, "Using JAX-RPC Parameter Modes with Apache Axis," SOA World Magazine, 2007 SYS-CON Media, Inc.
Frank Jennings, "Method Processing with Dynamic Proxies," JDJ, Apr. 24, 2003.
Anne Thomas Manes, "Standard Java APIs for Web Services," SOA World Magazine, 2007 SYS-CON Media, Inc.

* cited by examiner

*Primary Examiner*—Sana Al-Hashemi
(74) *Attorney, Agent, or Firm*—Michael J. Buchenhorner; Derek S. Jennings

(57) ABSTRACT

A method for hosting versioned web services includes steps of: receiving a request from a service requester, the request comprising version metadata; parsing the request; extracting the version metadata from the parsing step; and locating a target implementation version using the version metadata. If the target implementation version is located, the method proceeds by dynamically routing the versioned request to the target implementation version.

8 Claims, 6 Drawing Sheets

```
GET ENTRY
End of List?
      Yes – RETURN ERROR CODE
      No – Active Version?
            No – Go to GET ENTRY
            Yes – Active Match?
                  Yes – RETURN with Match
                  No – Go to GET ENTRY
                        Yes – Default?
                              No –Go to GET ENTRY
                              Yes – RETURN with Match
```

Implementation Version

Implementation Address

Service Interface Version

Compatible Interface Versions

Currently Active Interface Versions

Default Version Flag

State

*FIG. 5*

METHOD AND APPROACH TO HOSTING VERSIONED WEB SERVICES

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable.

FIELD OF THE INVENTION

The invention disclosed broadly relates to the field of web services and more particularly relates to the field of versioned web services.

BACKGROUND OF THE INVENTION

Web services are increasingly viewed as an important component in building distributed applications. As these services inevitably evolve and change, service version management will increasingly become a key part of the service lifecycle. In this context the lack of an end-to-end versioning model provides challenges to the service provider when trying to manage version transitions, especially in a continuous availability context, especially in the web services model of once published, always published. Versioning of web services is challenging, because it inevitably affects each part of the service lifecycle.

A common scenario is the rollout of a new version which is backward compatible with a previous version. Compatible version transition should ideally be handled in such a way that existing service consumers are insulated from any knowledge of the change. In a continuous availability context, the service provider ideally wants to manage this type of version transition smoothly in such a way that there is no service disruption. Ideally, a new version is appropriately tested in the production environment before committing to the transition. The transition is rolled out gradually (at whatever rate is appropriate) and with a way to smoothly back out or rollback problem versions. In order to support these types of transitions it is necessary to support concurrent deployment of multiple service versions. If two or more compatible versions of a service are deployed concurrently, the problem of how to route service requests to an appropriate version must be explicitly addressed.

The known art in supporting versioning of web services falls into two approaches. One focuses on methods of dealing with and or simplifying the problem of adaptation by the service consumer to service changes, i.e. requiring the active participation of the service consumer to cooperate with service provider changes. For a backward compatible change another approach is to address the version transition aspect with for example, an orchestration scheme to manage the transition as quickly as possible without any service disruption. This insulates the service consumer from any awareness of the change with the constraint being that only one version of the service can be active at a time.

The web services versioning problem is a subset of the second approach, the more general distributed programming model. A distributed programming model service, such as a web service, consists of a service implementation which performs some function (an implementation module), a service specification which describes the function and how the service can be invoked (such as a WSDL file), and service requesters which make service requests of the service provider following the service specification (such as a web service client). We use the more general term service in the following discussion with the understanding that it is applicable to a web services model as well as other distributed service models.

Versioning is an often overloaded term, which can have different meanings depending on the context or the viewpoint. From the service consumer's point of view, a web service "version" would describe and apply to the interface of the service—the operations and parameters, results, etc. of this particular version. A service provider, hosting multiple versions of a service, manages implementation versions which need to be installed, started, stopped, and so on. These two versioning concepts, while inter-related, are not the same.

During a service's lifetime, it will usually go through one or more revisions as requirements or business needs change. When a new version of a service is ready to be deployed, the service provider necessarily needs to plan for the upgrade. In selecting a version transition strategy, the service provider is faced with the task of introducing the new version in such a way so as to provide a smooth, managed transition, with support to back out a problem version, while maintaining continuous availability and minimizing the impact on service consumers.

One strategy which provides a smoother and more flexible (compatible) version transition is to support the side-by-side deployment of two versions. During a phased transition period, both versions can operate simultaneously until such a time as the system administrator is confident and ready to retire the old version. In practice, these transition periods can be arbitrarily long, especially with stateful services or long running business processes which have instantiated data associated with a particular version of the service.

In an unversioned environment, a common approach is usually limited to swapping the old version with a backward compatible new version. Without support for multiple version coexistence, some sort of rollout orchestration is used to handle the changeover as quickly as possible while maintaining continuous availability. This type of in place exchange, while transparent to the service consumer, provides little flexibility to the service provider. To get around the version coexistence limitation, the service provider can deploy a new version with a new name which, while giving more flexibility, has the unattractive quality of requiring the explicit cooperation of service consumers to adjust to the version change.

SUMMARY OF THE INVENTION

Briefly, according to an embodiment of the invention, a method for hosting versioned web services includes steps of: receiving a request from a service requester, the request comprising version metadata; parsing the request; extracting the version metadata from the parsing step; and locating a target implementation version using the version metadata. If the target implementation version is located, the method proceeds by dynamically routing the versioned request to the target implementation version.

A system for hosting versioned web services includes: a deployable module for implementing a service, the deployable module comprising an implementation version for supporting a particular interface version; a versioned implementation module for supporting concurrent deployment of multiple versions of the service; and a service proxy for a version group, the version group including at least one implementation version, wherein the service proxy is a local gateway to the collection of implementation versions of the service and provides a single destination for service requests for all versions of the service.

Further, a service for routing versioned service request includes steps of acts of: receiving a request from a service requester, the request including version metadata, parsing the request; extracting the version metadata from the parsing step; locating a target implementation version using the version metadata; and dynamically routing the versioned request to the target implementation version.

The method steps above can be performed by a computer program product tangibly embodied on a computer readable medium and including code for enabling the computer to perform the method steps.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 4 shows pseudo-code for the matching algorithm, according to an embodiment of the present invention;

FIG. 5 shows the elements of the version metadata, according to an embodiment of the present invention.

Figure 1:
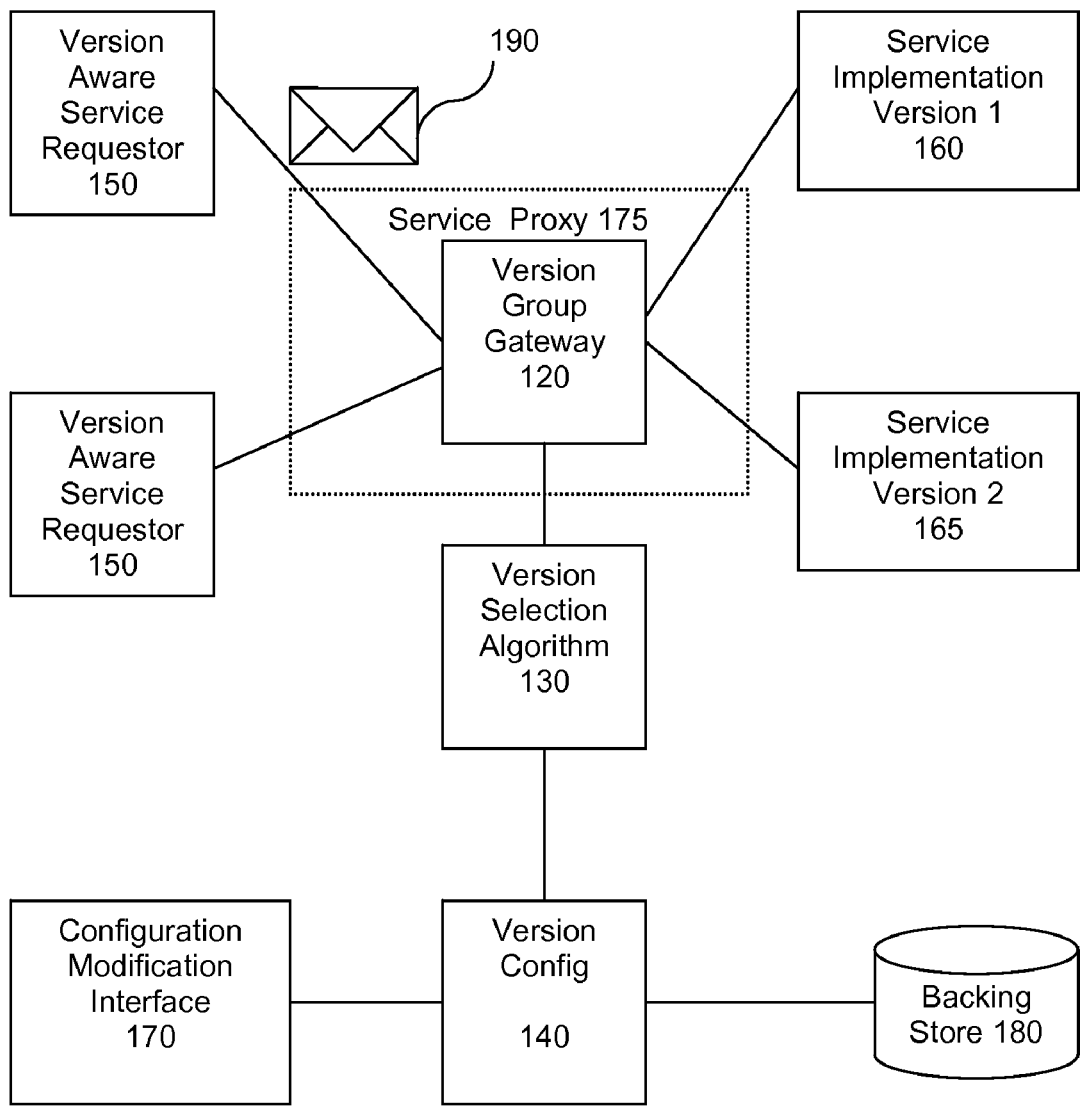
FIG. 1 is a simplified block diagram of a service hosting environment according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method for hosting versioned web services. Our approach separates the interface and implementation versions of a service. The interface version of a service is the (published) version of the service which describes the service interface characteristics (operations, parameters, results, behavior, and so on). The implementation version is the version of the deployed component which supports a particular interface. Each implementation version is accompanied by new version metadata which explicitly describes the interface version supported and (if any) set of other compatible interface versions supported. This metadata forms a version configuration model which is then used to dynamically link interface version requests to implementation versions at runtime.

The advantage of this approach is that it gives the service provider the flexibility to manage the transition between compatible versions, allowing concurrent deployment of multiple versions in a way that is transparent to the service consumer. An interface change can be picked up by new service consumers at development time, while existing service consumers which are bound to a previous version are identified by the service request version. The dynamic mapping at runtime allows the service provider to flexibly deploy and manage multiple versions of a service in a way that is transparent to a service consumer.

We draw a distinction between a service's interface and implementation version. We borrow the terminology of the software contract to describe the interface version, because it effectively defines a software contract between the client and the service provider. A client necessarily binds to a particular version of a service, with that particular version's set of operations, parameters, results, and so forth. When that client later invokes the service, it has an expectation of consistency of behavior. For example, the client expects that the service provider will adhere to the terms of the software contract in effect when the service was built. The service provider has a responsibility to assure that whichever implementation version handles this request, it will meet its contractual expectations. We call this the contract version or interface version, and it is this metadata which identifies a versioned service request.

Any discussion of the evolution of services and change is necessarily hinge on the question of compatibility. If change is inevitable, it is up to the service developer to decide how to introduce that change. The impact of a change can range from seamlessly backward compatible to incompatible requiring a whole new programming model. However, because of its inherent disruptive effects, incompatible change is relatively rare. The more typical pattern introduces change with some level of compatibility. For example, a bug-fix release would likely have the same (therefore compatible) interface. Or a version may introduce new operations or parameters while maintaining backward compatibility with the previous version.

Knowing the explicit compatibility relationship between two versions can be leveraged in the hosting environment. If version 2 is backward compatible with version 1, then it is eligible to have version 1 requests routed to it and can in fact replace version 1. However, if version 3 drops compatibility with the older version 1, the service provider may choose to keep both versions 2 and 3 deployed in order to not break clients using the old version 1 interface. Therefore, in addition to the contract version and the implementation version, we also add a compatibility assertion to our version metadata model.

This version metadata (service contract version, implementation version, and associated version compatibility assertions) is added to the system configuration and is used in controlling the version matching behavior of the service provider. Table 1 illustrates the version metadata of an exemplary service with three contract versions. Each implementation version supports a particular contract version, and has a set of other contract versions with which it is compatible.

Note that while contract version 1.1 is backward compatible with version 1.0, contract version 1.2 has dropped compatibility with the older 1.0 version.

TABLE 1

| Version metadata | | |
|---|---|---|
| contract version | implementation version | compatible contracts |
| 1.0 | 1.0.3 | 1.0 |
| 1.1 | 1.1.2 | 1.0, 1.1 |
| 1.2 | 1.2.1 | 1.1, 1.2 |

Using a layered hosting approach, with a version routing point, or gateway, which maps interface versioned requests to deployed implementation versions, provides the service provider the flexibility to manage phased version transitions while insulating service consumers from backend changes. Three of the key aspects of this service are: 1) distinguishing between a public interface version and a private implementation version; 2) creating a metadata version model to link implementation versions to supported interface versions; and 3) creating a metadata-driven selection algorithm to dynamically map interface versioned requests onto implementation versioned services. FIG. 1 illustrates our approach, with version aware service consumers 150 submitting versioned service requests 190 to a Version Group Gateway 120.

The gateway's functions are broken down into three steps as follows: 1) extract any version metadata from the request; 2) version selection (calling the version selection algorithm 130); and 3) route the request to the selected endpoint. To extract the metadata, the gateway 120 parses the request message 190 to extract any version metadata (e.g. the contract version). Depending on the messaging protocol, the version metadata will need to be encoded differently, so this step must be protocol aware. Once the version metadata is retrieved, the gateway 120 invokes the Version Selection Algorithm 130 to determine the correct implementation target version 160 or 165 for a particular request 190. The gateway 120 then dynamically re-routes the request to the selected implementation version. It should be noted that the example of FIG. 1 shows only two target versions, for clarity. Any number of target versions and consumers may benefit from the hosting service as described herein.

In this design, one or more versions of a particular service deployed side-by-side form a version group. The aggregate of the individual service's versioning metadata forms the version group configuration which controls the request routing behavior of the system 100.

The Service Proxy 175 is logically positioned between service implementation versions 160 and 165 and the version aware clients 150. The Service Proxy 175 is the endpoint to which client applications bind. This structure insulates the client applications from the details of the implementation versioning changes and effectively puts the service provider in control of version routing selection.

Figure 2:
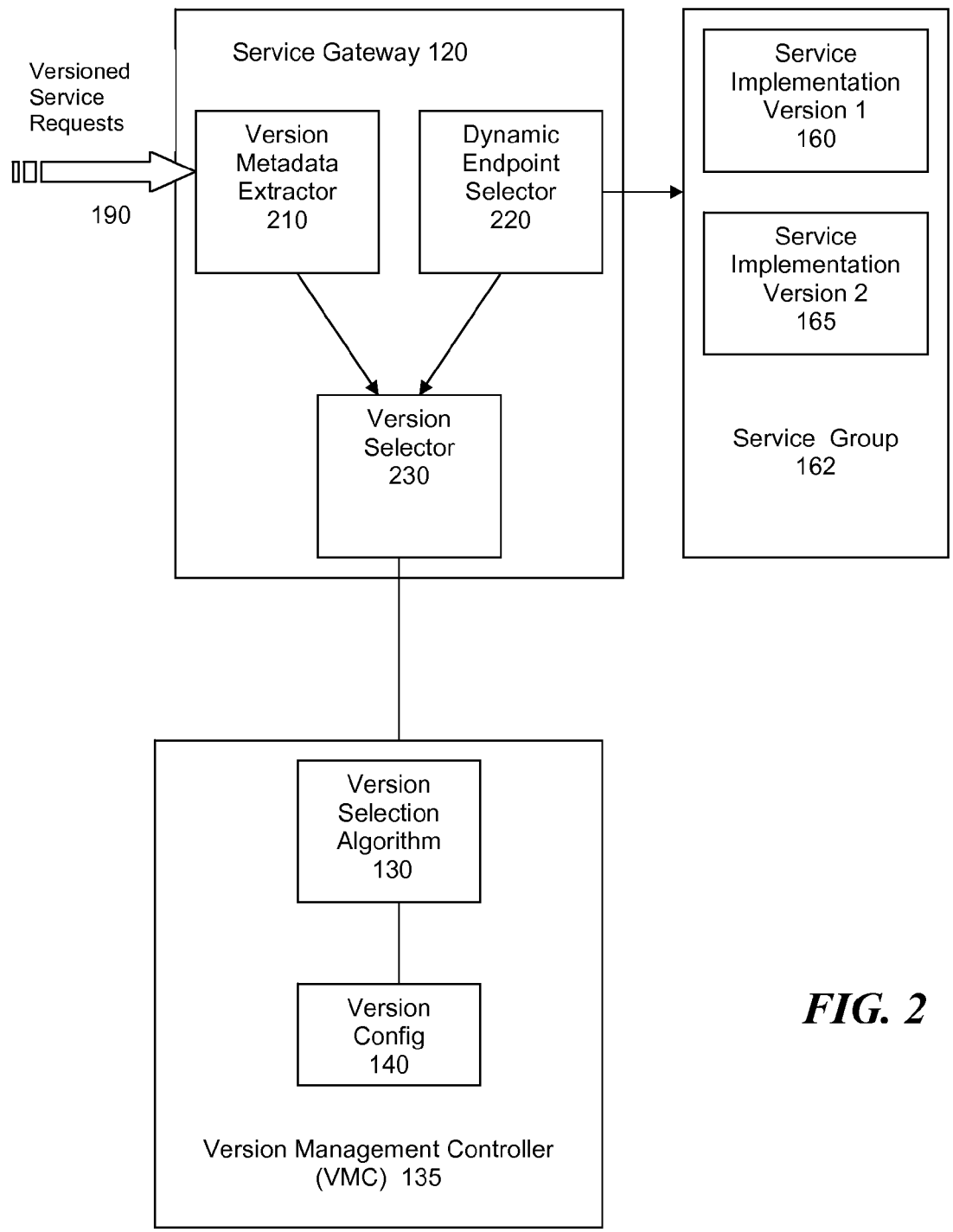
FIG. 2 is a simplified block diagram of an exemplary implementation of the hosting environment of FIG. 1, according to an embodiment of the present invention.

Referring to FIG. 2 there is shown an exemplary implementation of the embodiment of FIG. 1. The three main logical components of the gateway 120 are shown in FIG. 2: Version Metadata Extractor 210, Dynamic Endpoint Selector 220, and Version Selector 230.

Figure 3:
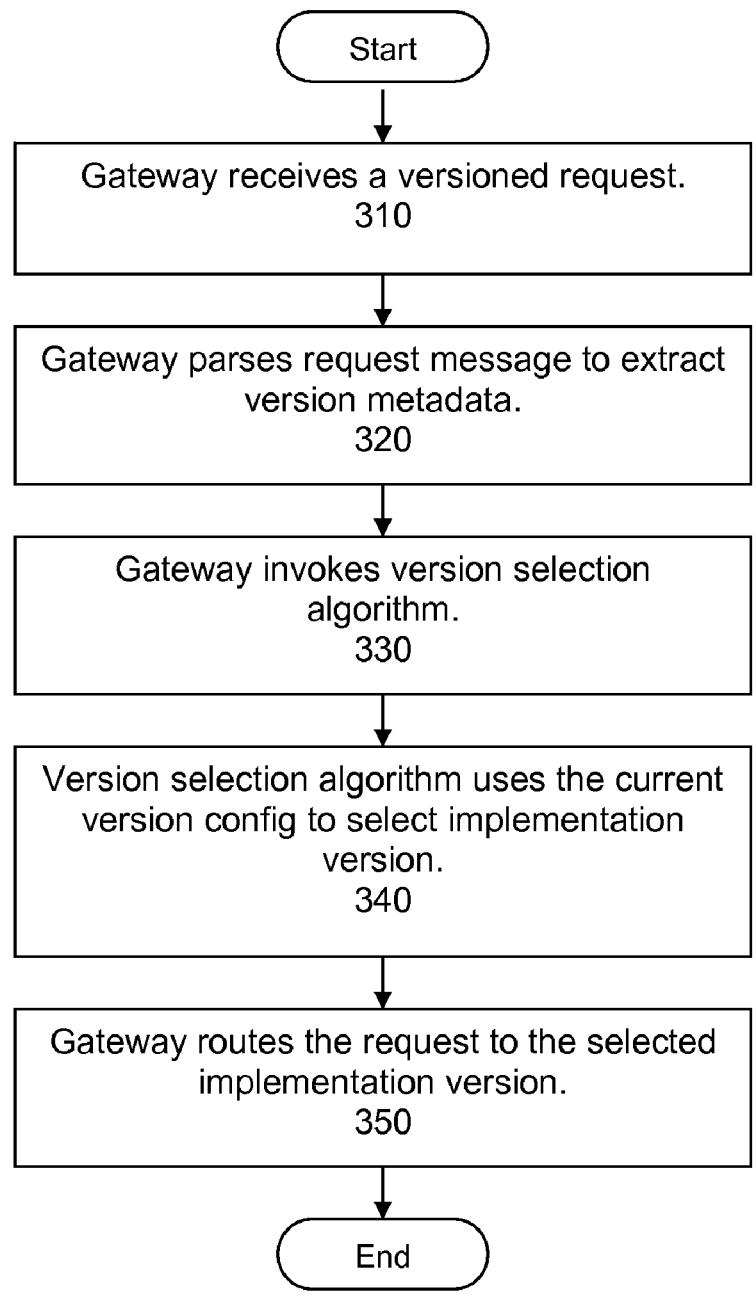
FIG. 3 is a flowchart of a method according to an embodiment of the present invention.

Referring to FIG. 3 there is shown a flow chart of the process steps for hosting versioned web services according to an embodiment of the present invention. In step 310 the Service Gateway 120 receives the versioned requests 190. In step 320 the Version Metadata Extractor 210 parses the request message 190 to extract any version metadata (that is, the contract version).

Once the version metadata is extracted, in step 330 the Gateway 120 invokes the Version Management Controller (VMC) 135, possibly through its version mapping API, to determine the correct target. In step 340 the Endpoint Selector 220 parses the service context and the contract version metadata extracted in step 320 to the VMC 135 which determines the correct endpoint in the service group 162. It should be noted that the separation of functionality between the VMC 135 and the gateway 120 as depicted in FIG. 2 is just one example of how the roles can be assigned. In an alternate embodiment, the Gateway 120 is configured to perform the role of the VMC 135 as well. On the other hand, the VMC 135 may also be configured to take on some of the roles shown as performed by the Gateway 120.

In step 350 the Gateway 120 then dynamically re-routes the request 190 through a service bus to the endpoint of the target implementation version (160 or 165 in this example).

When a new implementation version of a service is installed, a version group member is created and its versioning metadata is added to the existing hosting configuration. The metadata contains the contract version, implementation version (and associated implementation endpoint or address) and compatibility assertions. In addition to these fixed attributes, we add three tunable parameters (active interface set, the version state, and the default indicator) which are used to control how the Gateway 120 routes requests.

Referring now to FIG. 5, there is shown a list summarizing the version configuration metadata 500:

implementation version—this is the version of the deployed module implementing the service;

implementation address—target address;

service interface version—this is the published interface version which is used by the client;

compatible interface versions—this is the set of interface versions this implementation can support;

currently active interface versions—this is the subset of the compatible interface versions this implementation is currently actively supporting;

default version flag (true/false)—One member of each version group can be tagged as the default version which is designated as the default target to route unversioned requests or in certain cases, versioned requests that cannot be matched with any of the deployed versions in the group; and state (active/inactive)—this is the state (active/inactive) flag indicates whether this implementation is able to handle requests The default version is also useful in dealing with the transition from unversioned legacy services; an implementation which has been marked as inactive is not eligible to receive requests. Multiple implementation versions supporting the same interface version would not be activated concurrently. The endpoint is the unique target for this implementation version which the gateway uses as the routing destination.

Table 2 shows an example of the configurable metadata of four deployed versions of a service with their deployed endpoints purposely omitted for simplicity. In this version group, version 1.0.3 can support service contract 1.0, version 1.1.2 can support both contract versions 1.0 and 1.1 and version 1.2.1 can support only contract version 1.2. Currently, three deployed versions are serving requests side-by-side, and version 1.0.3 is designated as the default version of the group for unversioned requests. Note that while there are two deployed versions which support the 1.1 contract, only one of them (1.1.2) is active.

TABLE 2

Sample Version Routing Metadata.

| Contract Version | Active Contracts | Compatible Contracts | Deployed Version | Active | Default |
|---|---|---|---|---|---|
| 1.0 | 1.0 | 1.0 | 1.0.3 | Yes | Yes |
| 1.1 | 1.1 | 1.0, 1.1 | 1.1.1 | No | No |
| 1.1 | 1.1 | 1.0, 1.1 | 1.1.2 | Yes | No |
| 1.2 | 1.2 | 1.2 | 1.2.1 | Yes | No |

Since an interface version can be supported by multiple implementation versions in a version group, care must be exercised when configuring the metadata to avoid routing conflicts. For example, if the service administrator decides to retire version 1.0.3 and to forward all the traffic for service contract 1.0 to version 1.1.2, the version metadata of version 1.0.3 is configured to turn the active flag to be false and contract version 1.0 needs to be added to the active contracts that version 1.1.2 currently supports. This is represented in the configuration shown in Table 3. Therefore, configuration validation is necessary to assure a consistent configuration.

TABLE 3

Sample Version Routing Metadata.

| Contract Version | Active Contracts | Compatible Contracts | Deployed Version | Active | Default |
|---|---|---|---|---|---|
| 1.0 | 1.0 | 1.0 | 1.0.3 | No | No |
| 1.1 | 1.0, 1.1 | 1.0, 1.1 | 1.1.2 | Yes | Yes |
| 1.2 | 1.2 | 1.2 | 1.2.1 | Yes | No |

The version metadata discussed so far are sufficient to handle basic version management. They can be extended to include other attributes for more complex scenarios. For example one could add time-based version routing with the addition of a valid-from/valid-to time window.

The Version Selection algorithm 130 takes the requested interface version 190 as input and searches the version group configuration to find the appropriate implementation version to handle this request. This matching algorithm is described in the pseudo-code of FIG. 4. If a match is found, the Algorithm 130 returns the matching implementation address to the Gateway 120. If no match is found, the algorithm 130 returns an error and the Gateway 120 can return an appropriate error result to the service requester 150.

Figure 6:
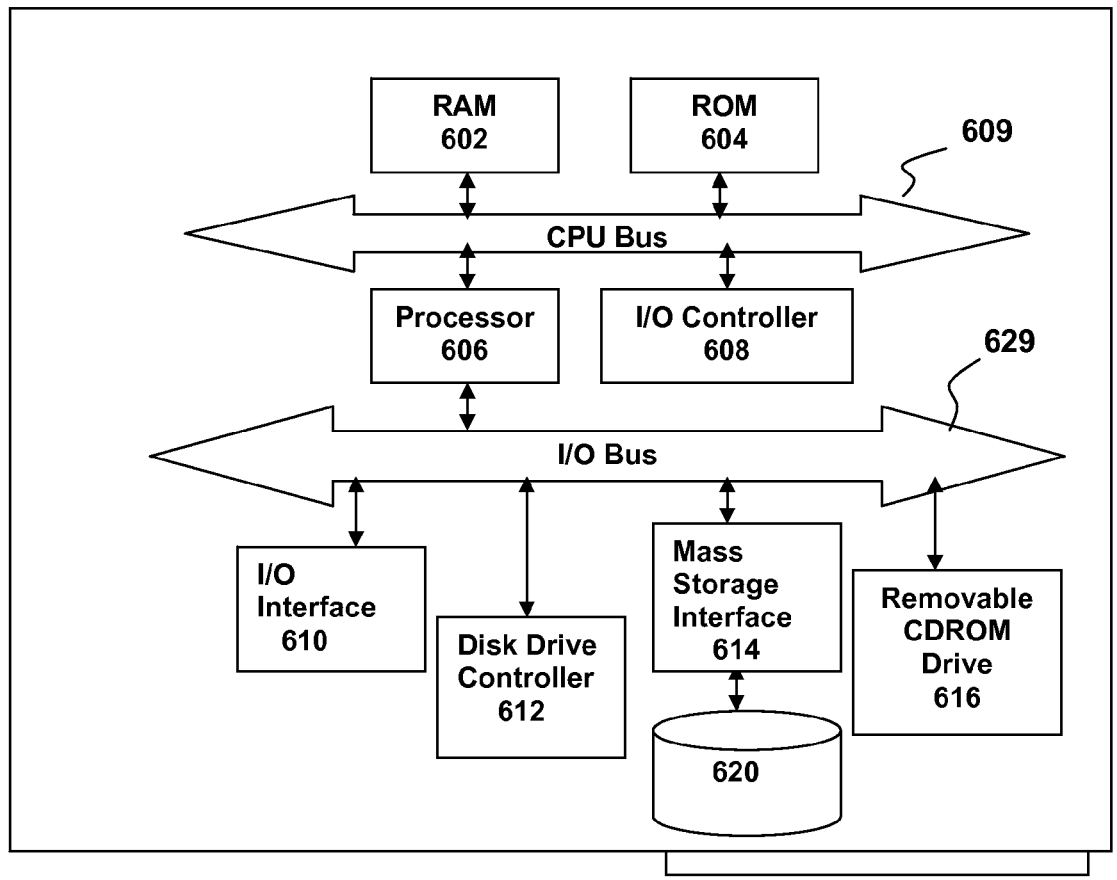
FIG. 6 is a simplified block diagram of a programmable computer configured to operate according to an embodiment of the present invention.
Figure 6:
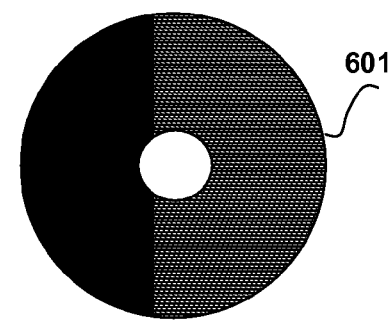

FIG. 6 is a simplified block diagram of a programmable computer that can be configured to operate according to an embodiment of the invention. According to an embodiment of the invention, a computer readable medium, such as a CDROM 601 can include program instructions for operating the programmable computer 600 according to the invention. The processing apparatus of the programmable computer 600 comprises: random access memory 602, read-only memory 604, a processor 606 and input/output controller 608. These are linked by a CPU bus 609. Additionally, there is an input/output bus 629, and input/output interface 610, a disk drive controller 612, a mass storage device 620, a mass storage interface 614, and a removable CDROM drive 616.

It is important to note that the present invention as shown in FIG. 6 has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include CD-ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

According to another embodiment of the invention, a computer readable medium, such as the CD-ROM 601 can include program instructions for operating the programmable computer 600 according to the invention. What has been shown and discussed is a highly-simplified depiction of a programmable computer apparatus 600. Those skilled in the art will appreciate that a variety of alternatives are possible for the individual elements, and their arrangement, described above, while still falling within the scope of the invention.

This method as described can be performed as a service for a second party. In a service embodiment, the Gateway 120, the VMC 135, or both, can perform their respective functions for a fee. The fee can be a per-usage fee or a monthly subscription fee.

An interface to dynamically modify the version configuration has been described. This version configuration interface gives the service provider control over the routing behavior through functions to view, modify and verify the version group configuration. To guard against an inconsistent configuration, the controller validates and rejects the configuration before committing any changes which create routing conflicts. Through this interface the service provider can modify the active interface version set, the version state (active/inactive) and the default indicator. These controls allow the system provider the flexibility to dynamically control the version selection behavior of the system.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A system for hosting versioned web services, the system comprising:
    a deployable module for implementing a web service, the deployable module comprising:
        a supported interface version comprising a description of service interface characteristics of the web service; and
        an implementation version for supporting the interface version, said implementation version comprising version metadata describing the supported interface version supported and any set of other compatible supported interface versions;
    a versioned implementation module for supporting concurrent deployment of multiple versions of the deployable module; and
    a service proxy for a version group, wherein the service proxy is a local gateway to a collection of implementation versions of the web service and provides a target destination for service interface requests for all versions of the web service;

wherein the service proxy is configured to:

receive the service interface request from the version group, the request comprising the version metadata describing the supported interface version of the requested web service;

parse the service interface request;

extract the version metadata from the parsing step;

dynamically map the supported interface version from the extracted version metadata to the implementation version at the target destination; and dynamically route the service interface request to the target destination.

2. The system of claim 1 wherein the implementation version comprises a set of other compatible supported interface versions.

3. The system of claim 1 wherein the implementation version is individually addressable.

4. The system of claim 1 wherein the implementation version is individually addressable for enabling multiple implementation versions to be deployed concurrently at a service provider without conflict.

5. The system of claim 2 wherein the version metadata comprises:

the service interface version, an implementation address for directing the web service request to this implementation version.

6. The system of claim 1 further comprising:

a version management controller operatively connected to the service proxy, said version management controller comprising a version selection algorithm for mapping the target destination using the version metadata.

7. The system of claim 5 wherein the version metadata further comprises:

a default version flag for tagging one version of the version group as a default target for routing requests.

8. The system of claim 5 wherein the version metadata further comprises:

a state flag indicating whether the implementation version is able to handle the web service request.

* * * * *